United States Patent
Agombar et al.

(10) Patent No.: US 10,055,292 B2
(45) Date of Patent: Aug. 21, 2018

(54) PARITY DELTA CACHING FOR SHORT WRITES

(71) Applicant: International Business Machines Corporation, Armonk, NY (US)

(72) Inventors: John P. Agombar, Winchester (GB); Ian Boden, Eastleigh (GB); Gordon D. Hutchison, Eastleigh (GB); Lee J. Sanders, Chichester (GB)

(73) Assignee: International Buisness Machines Corporation, Armonk, NY (US)

( * ) Notice: Subject to any disclaimer, the term of this patent is extended or adjusted under 35 U.S.C. 154(b) by 96 days.

(21) Appl. No.: 15/283,737

(22) Filed: Oct. 3, 2016

(65) Prior Publication Data

US 2018/0095824 A1   Apr. 5, 2018

(51) Int. Cl.
G11C 29/00 (2006.01)
G06F 11/10 (2006.01)
G06F 3/06 (2006.01)

(52) U.S. Cl.
CPC .......... *G06F 11/1076* (2013.01); *G06F 3/064* (2013.01); *G06F 3/0619* (2013.01); *G06F 3/0689* (2013.01)

(58) Field of Classification Search
CPC ......... G06F 12/0246; G06F 2211/1009; G06F 11/108; G06F 11/2023; G06F 11/2035; G06F 11/2043; G06F 11/2089; G06F 11/1415; G06F 11/1076; G06F 2211/1059; G06F 11/1068; H03M 13/09; H04L 1/0063; G11C 29/52
See application file for complete search history.

(56) References Cited

U.S. PATENT DOCUMENTS 8,196,018 B2   6/2012   Forhan et al.
2011/0208995 A1   8/2011   Hafner et al.
(Continued)

FOREIGN PATENT DOCUMENTS

EP   0612015 A1   8/1994

OTHER PUBLICATIONS

Debnath, Suman, "Rewinding for Future—The Science of Storage," https://wisestorage.wordpress.com/, Nov. 2014.
(Continued)

*Primary Examiner* — Guy Lamarre
(74) *Attorney, Agent, or Firm* — Nelson and Nelson; Daniel P. Nelson; Alexis V. Nelson

(57) ABSTRACT

A method for reducing I/Os to a redundant array of independent disks (RAID) is disclosed. In one embodiment, such a method includes receiving a write request comprising new data for overwriting corresponding old data in cache. The method performs an XOR (exclusive OR) operation on the new data and the old data to yield a parity delta and overwrites, in the cache, the old data with the new data. In certain embodiments, the XOR operation is performed prior to overwriting the old data with the new data. The method further stores the parity delta in the cache and links the parity delta to the new data. Upon destaging the new data from the cache, the method provides the parity delta with the new data so that the parity delta may be applied to an existing parity value in the RAID. A corresponding system and computer program product are also disclosed.

18 Claims, 8 Drawing Sheets

(56) References Cited

U.S. PATENT DOCUMENTS

2014/0223094 A1    8/2014   Baderdinni et al.
2015/0161003 A1*   6/2015   Yoshihara ........... G06F 12/0246
                                                          714/766

OTHER PUBLICATIONS

Chung, Ching-Che, et al., "Partial Parity Cache and Data Cache Management Method to Improve the Performance of an SSD-Based RAID," IEEE Transactions on Very Large Scale Integration (VLSI) Systems, vol. 22, No. 7, Jul. 2014.

* cited by examiner

PARITY DELTA CACHING FOR SHORT WRITES

BACKGROUND

Field of the Invention

This invention relates to systems and methods for reducing I/O to redundant arrays of independent disks (RAIDs).

Background of the Invention

A RAID (i.e., a Redundant Array of Independent Disks) is a storage technology that provides increased storage functions and reliability through redundancy. A RAID is created by combining multiple storage drive components (disk drives and/or solid state drives) into a logical unit. Data is then distributed across the drives using various techniques, referred to as "RAID levels." The standard RAID levels, which currently include RAID levels 1 through 6, are a basic set of RAID configurations that employ striping, mirroring, and/or parity to provide data redundancy. Each of the configurations provides a balance between two key goals: (1) increasing data reliability and (2) increasing I/O performance.

For short writes (writes less than a full stride), RAIDs may be subject to a phenomena known as "I/O amplification." Specifically, when performing a short write to a RAID, old data may need to be read and compared (i.e., XORed) with the new data being written in order to caluate a parity delta. This parity delta may be used to update the parity value for the stride. Alternatively, data in the stride other than the new data may be read and used along with the new data to directly recalculate the parity value for the stride. In either case, a single short write may result in significantly more I/Os to backend storage devices making up the RAID, in effect "amplifying" the I/O to the RAID. These additional I/Os may slow down the RAID, increase traffic in the network, and increase wear and tear on backend storage drives.

In view of the foregoing, what are needed are systems and methods to more efficiently update parity information when making short writes to a RAID. Ideally, such systems and method will reduce the number of I/Os made to backend storage drives making up the RAID.

SUMMARY

The invention has been developed in response to the present state of the art and, in particular, in response to the problems and needs in the art that have not yet been fully solved by currently available systems and methods. Accordingly, the invention has been developed to reduce I/Os to a redundant array of independent disks (RAID). The features and advantages of the invention will become more fully apparent from the following description and appended claims, or may be learned by practice of the invention as set forth hereinafter.

Consistent with the foregoing, a method for reducing I/Os to a redundant array of independent disks (RAID) is disclosed herein. In one embodiment, such a method includes receiving a write request comprising new data for overwriting corresponding old data in cache. The method performs an XOR (exclusive OR) operation on the new data and the old data to yield a parity delta and overwrites, in the cache, the old data with the new data. In certain embodiments, the XOR operation is performed prior to overwriting the old data with the new data. The method further stores the parity delta in the cache and links the parity delta to the new data. Upon destaging the new data from the cache, the method provides the parity delta with the new data so that the parity delta may be applied to an existing parity value in the RAID.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
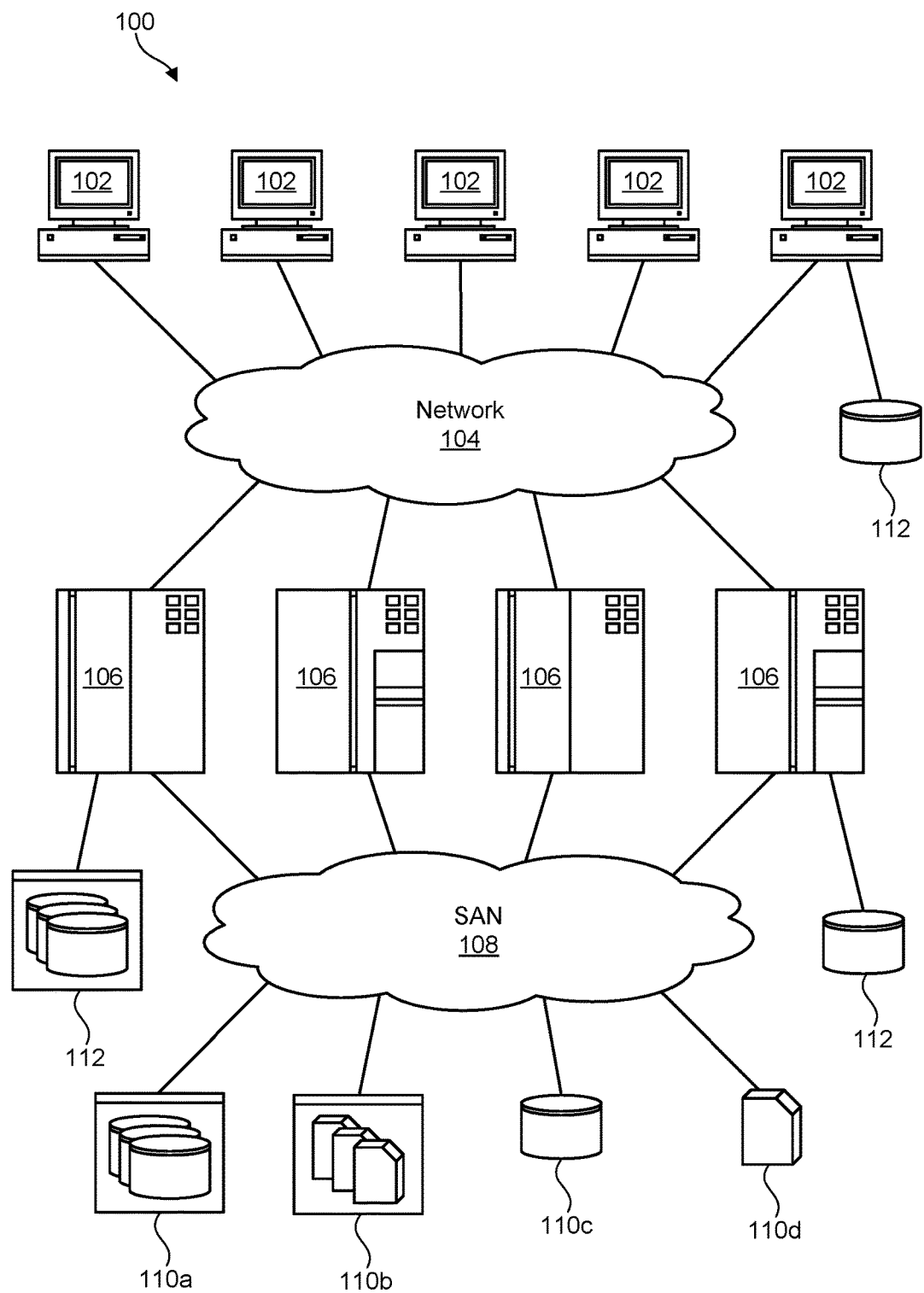
FIG. 1 is a high-level block diagram showing one example of a network environment in which a system and method in accordance with the invention may be configured to operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to customize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
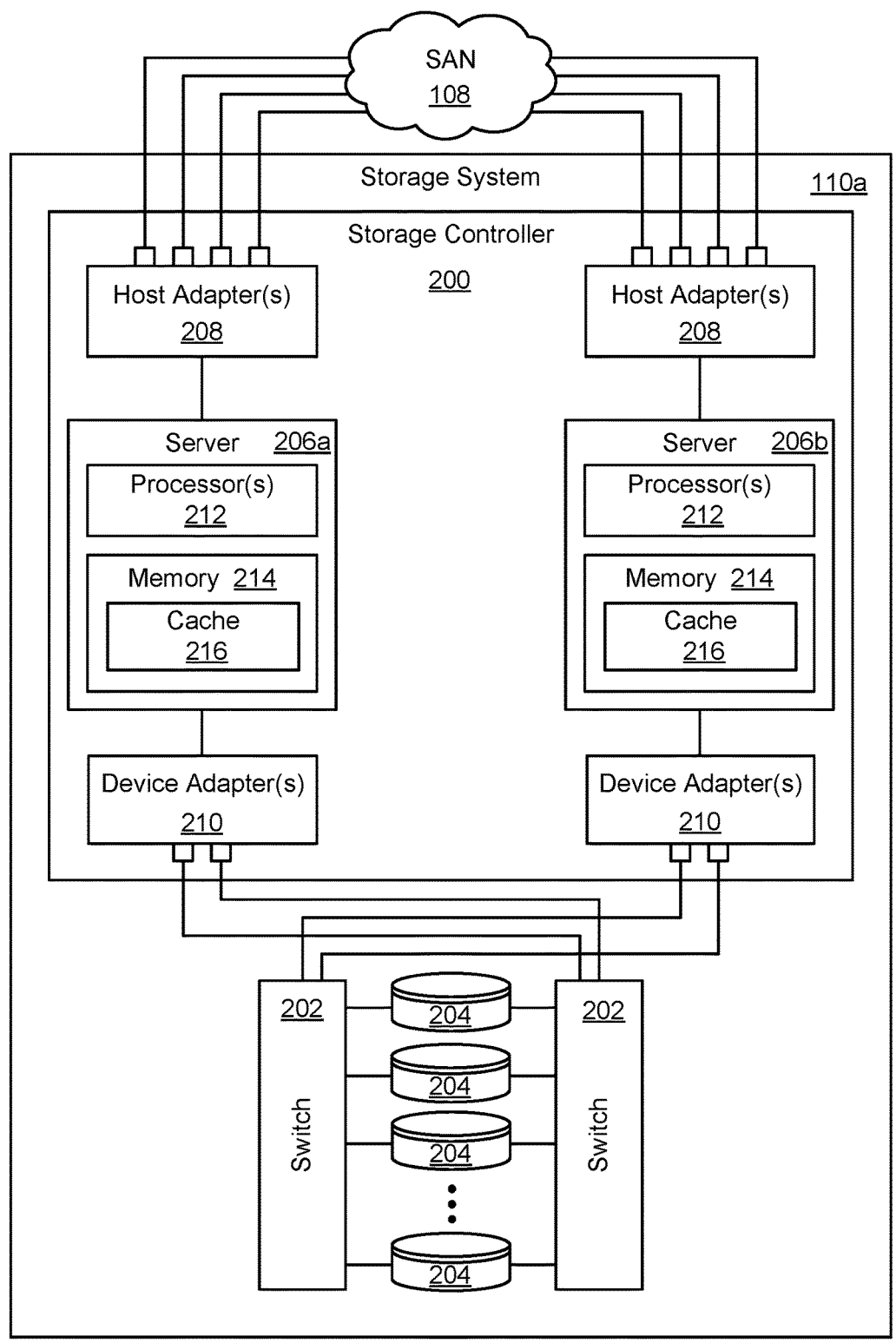
FIG. 2 is a high-level block diagram showing one embodiment of storage system containing backend storage drives that may be used to implement a RAID.

Referring to FIG. 2, one example of a storage system 110a containing an array of hard-disk drives 204 and/or solid-state drives 204 is illustrated. The internal components of the storage system 110a are shown since a RAID may, in certain embodiments, be implemented all or partly within such a storage system 110a. As shown, the storage system 110a includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The memory 214 may include cache 216 for caching reads and writes to the storage drives 204, as well as other important and/or frequently accessed data. The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110a, but may be implemented in any comparable or analogous storage system 110, regardless of the manufacturer, product name, or components or component names associated with the system 110. Thus, the IBM DS8000 ™ is presented only by way of example and not limitation.

Figure 3:
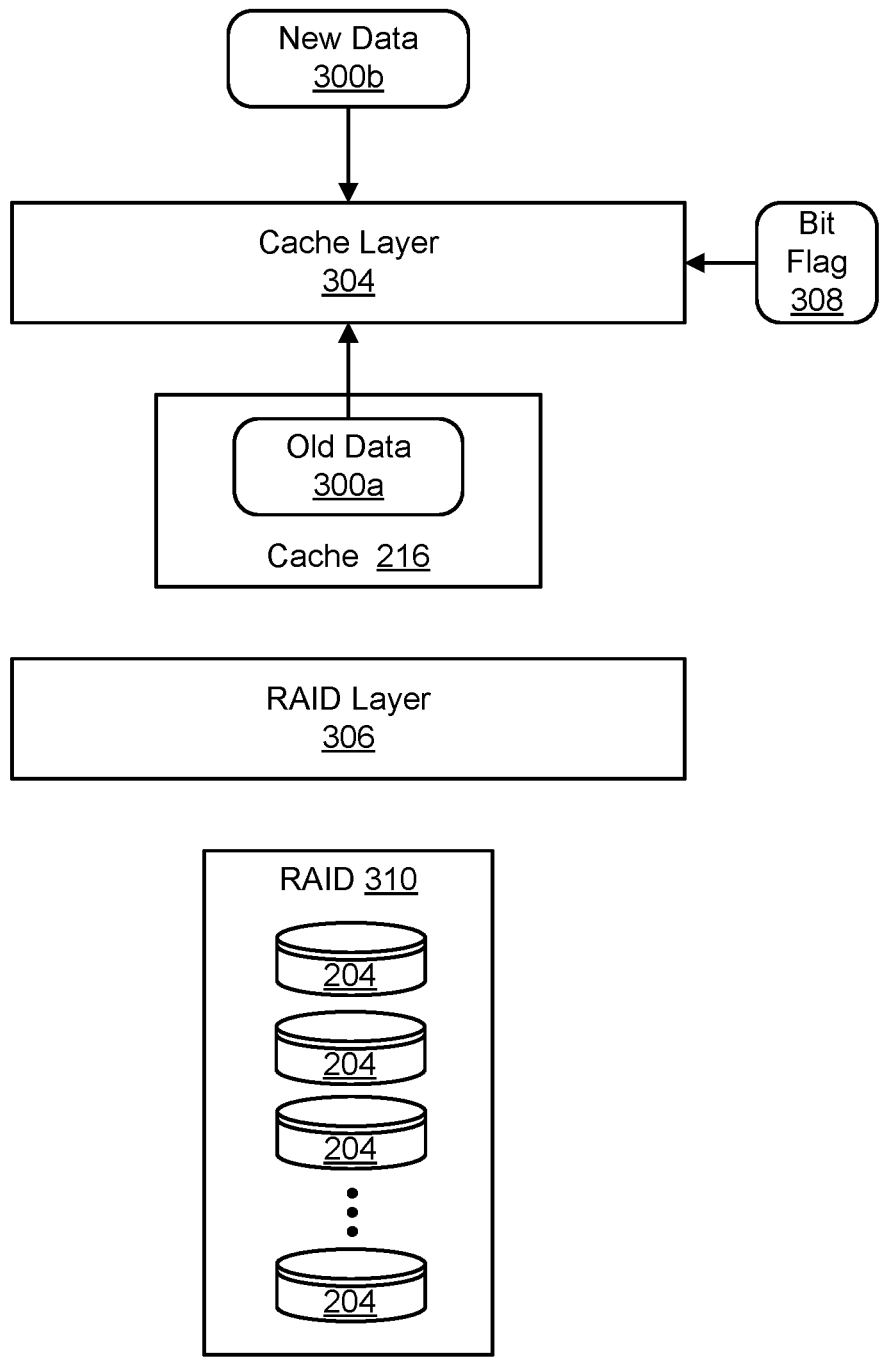
FIG. 3 is a high-level block diagram showing calculation of a parity delta by performing an XOR operation between new data and old data in cache.
Figure 4:
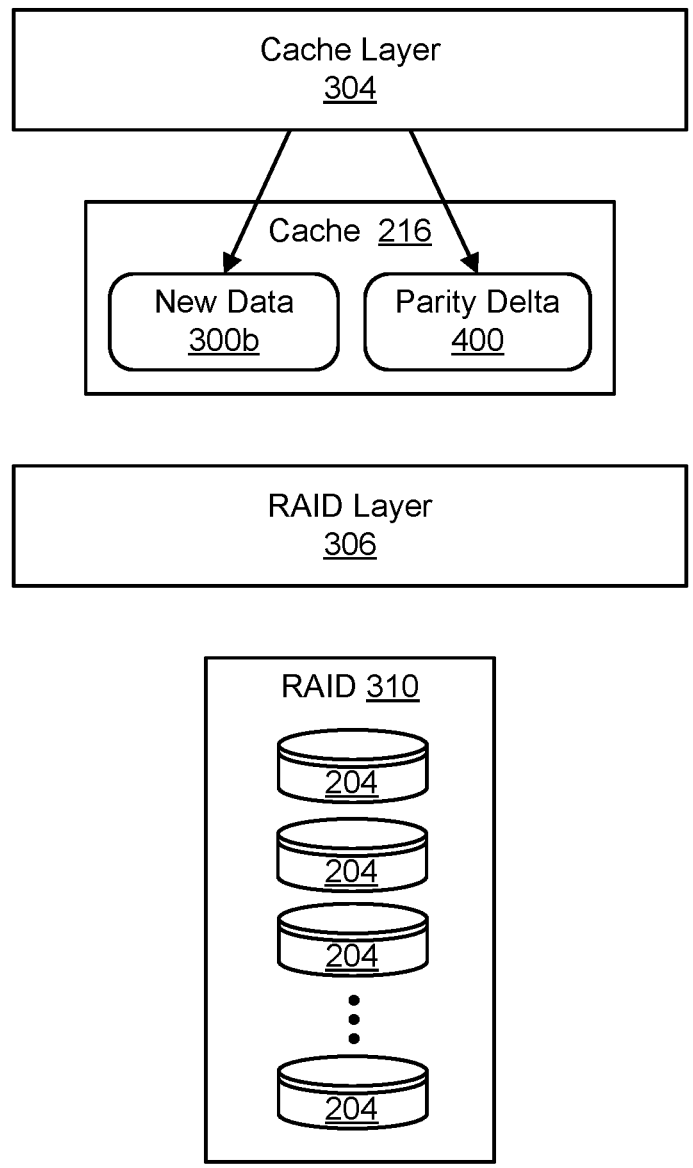
FIG. 4 is a high-level block diagram showing storage of the new data and parity delta in cache.
Figure 5:
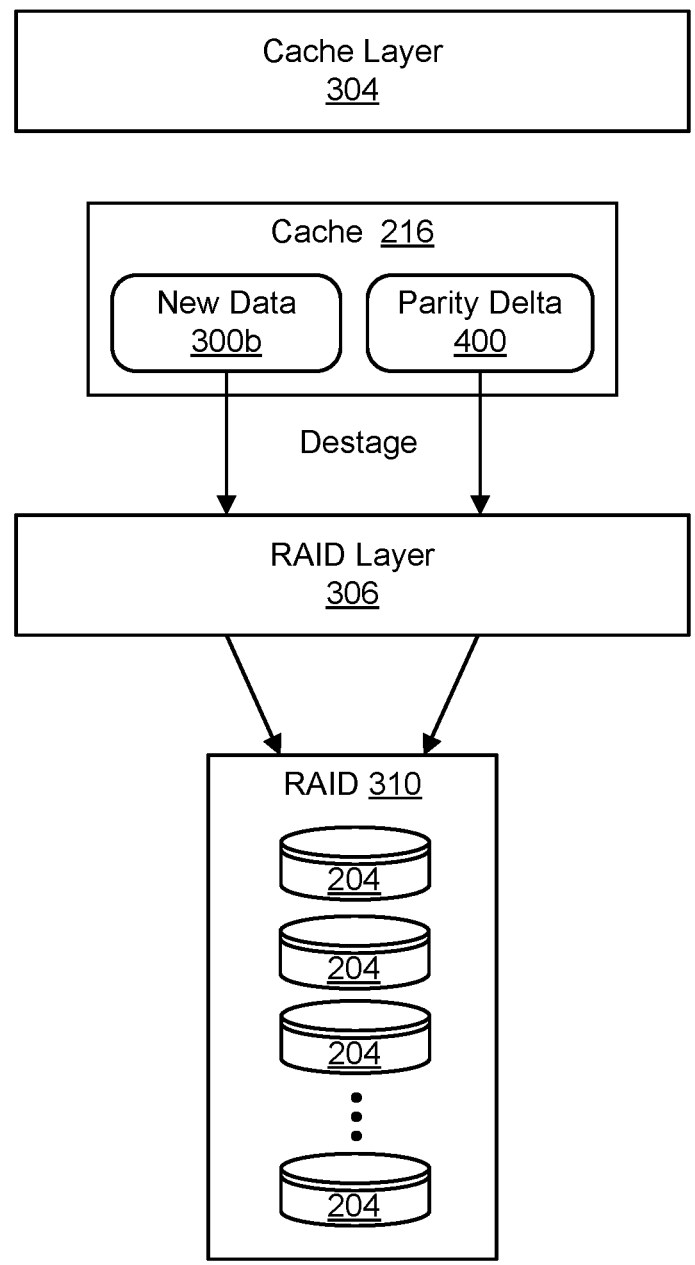
FIG. 5 is a high-level block diagram showing destaging of the new data and parity delta from cache.

Referring generally to FIGS. 3 through 5, as previously mentioned, for short writes to a RAID, I/Os to backend storage drives 204 may be amplified. Specifically, when performing a short write to a RAID 310, old data may need to be read and XORed with the new data being written in order to calculate a parity delta. This parity delta may be used to update the parity value associated with the stride. Alternatively, data in the stride other than the new data may be read and used along with the new data to directly recalculate the parity value for the stride. In either case, a single short write may result in significantly more I/Os to backend storage devices 204 making up the RAID 310, in effect "amplifying" the I/O to the RAID 310. These additional I/Os may slow down the RAID 310, increase traffic in the network, and increase wear and tear on backend storage drives 204.

In order to alleviate the I/O amplification issues discussed above caused by short writes, systems and methods in accordance with the invention may be provided to more efficiently calculate parity information when making short writes to a RAID 310. Such systems and method will ideally reduce a number of I/Os made to backend storage drives 204 making up the RAID 310. As will be discussed in association with FIG. 3 through 5, systems and methods in accordance with the invention may rely on the fact that, when data is destaged from a cache 216 to a RAID 310, a copy of the data often remains in the cache 216 in the event it is needed again. Because this data 300a resides in cache 216, if and when the data 300a is overwritten, parity delta information 400 may be readily calculated using the old data 300a and the new incoming data 300b prior to overwriting the old data 300a. The parity delta 400 may be stored in cache 216 along with the new data 300b, and destaged from the cache 216 along with the new data 300b. When the new data 300b is destaged, the new data 300b may be written to the RAID 310 and the parity delta 400 may be applied to (e.g., XORed with) the parity value of the stride containing the new data 300b. This will reduce or eliminate the need to read data from the RAID 310 to calculate the new parity value. This, in turn, reduces I/O to backend storage drives 204 of the RAID 310, thereby improving performance of the RAID 310, reducing traffic in the network, and reducing wear and tear on the backend storage drives 204.

FIGS. 3 through 5 show a sequence of events that may occur when new data 300b overwrites old data 300a in the cache 216. As shown in FIG. 3, when old data 300a has been destaged to a RAID layer 306 and written to a RAID 310, but a copy still remains in cache 216, a bit flag 308 associated with the data may be set. When new data 300b is received by a cache layer 304 to overwrite the old data 300a in cache 216, the cache layer 304 may check the bit flag 308 to determine if the old data 300a has already been destaged to the RAID layer 306. If the bit flag 308 is set, the cache layer 304 XORes the new data 300b with the old data 300a to generate a parity delta, prior to overwriting or deleting the old data 300a. As shown in FIG. 4, this parity delta 400 may be stored in cache 216 along with the new data 300b.

Figure 6:
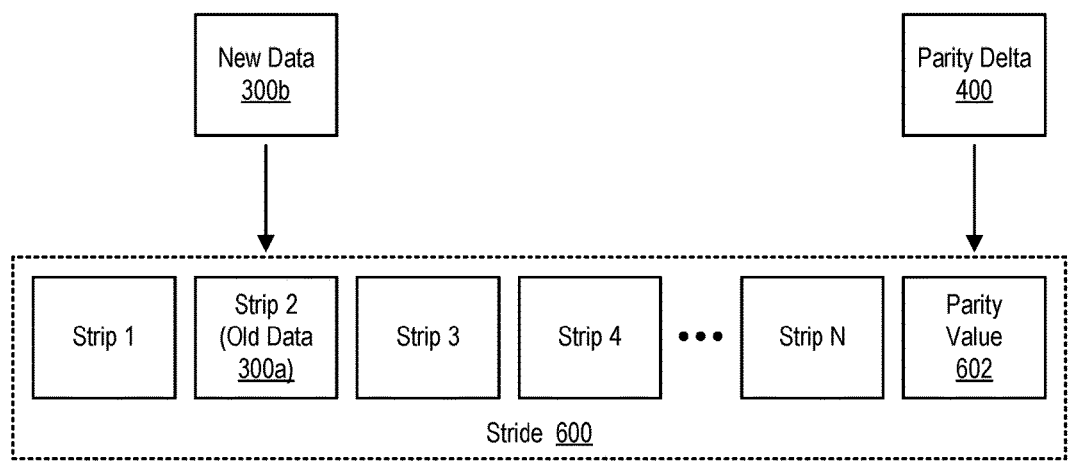
FIG. 6 is a high-level block diagram showing application of the new data and parity delta to a stride in the RAID.

As shown in FIG. 5, when the new data 300b is destaged to the RAID layer 306 so that it can be written to the RAID 310, the parity delta 400 (or an address of the parity delta 400 in cache 216) may be provided with the new data 300b. The RAID layer 306 may write the new data 300b to the RAID 310 and apply the parity delta 400 to a parity value in the stride 600, as shown in FIG. 6. As shown in FIG. 6, a stride 600 may include a plurality of strips, where each strip is located on a separate storage drive 204. The stride 600 may also include at least one parity value 602, located on a separate storage drive 204, that may be used to reconstruct a strip in the event it is lost.

In this example, assume that the new data 300b discussed in association with FIGS. 3 through 5 is associated with strip 2 in the stride 600. When the RAID layer 306 writes this new data 300b to the stride 600, the old data 300a in strip 2 is overwritten. The RAID layer 306 further applies the parity delta 400 received from the cache 216 to the parity value 602 in the stride 600. This may be accomplished by XORing the parity delta 400 with the parity value 602. This updates the parity value 602 to reflect the newly written data 300b in the stride 600. Using this technique, the RAID layer 306 does not need to read any strip in the stride 600 in order to arrive at the new parity value 602, thereby reducing "I/O amplification" as previously discussed. The parity delta 400 from cache 216 is sufficient to update the parity value 602. Thus, in the described embodiment, functionality to calculate the parity delta 400 is offloaded from the RAID layer 306 to the cache layer 304.

Figure 7:
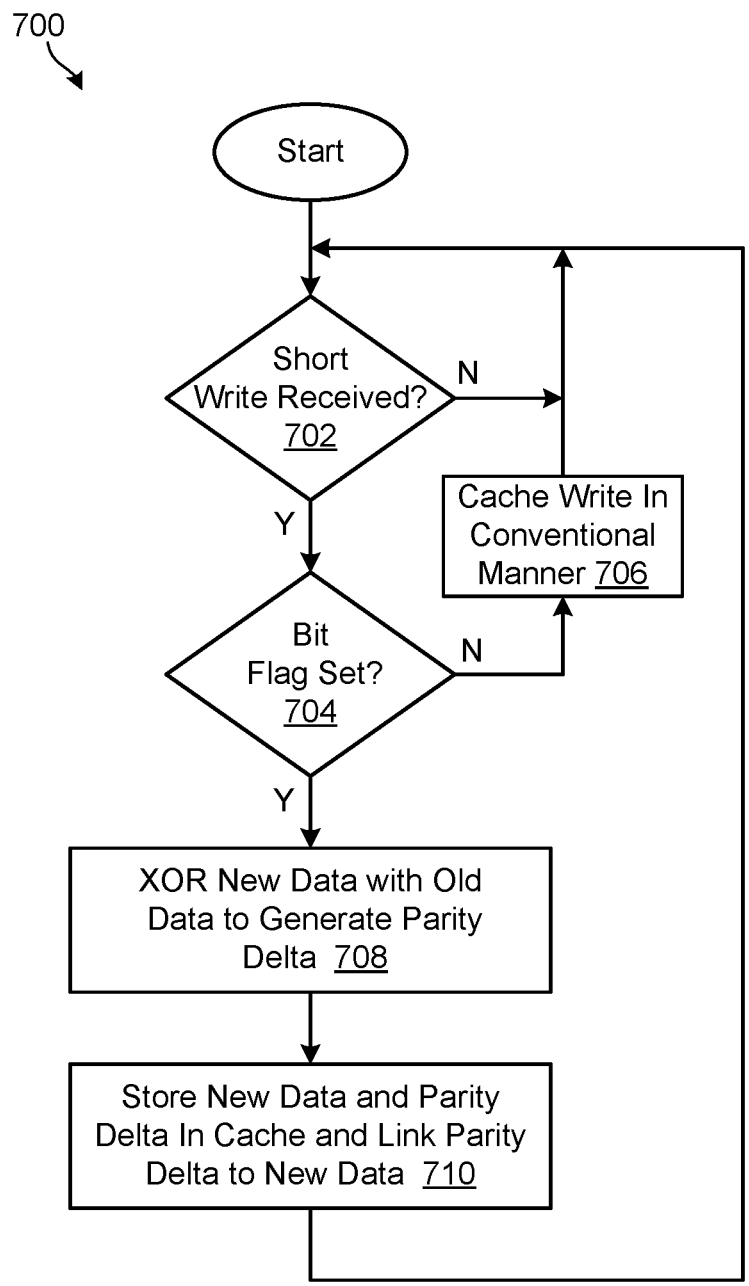
FIG. 7 is a process flow diagram showing one embodiment of a method for caching a short write and associated parity delta.

Referring to FIG. 7, a process flow diagram, showing one embodiment of a method 700 for caching a short write to a RAID 310, is illustrated. As shown, the method 700 initially determines 702 whether a short write (i.e., a write less than a full stride) has been received. If a short write has been received, the method 700 determines 704 whether the bit flag 308 is set for the data (or storage space) that is being written to. If the bit flag 308 is not set, the method 700 caches 706 the write in a conventional manner and the method 700 ends (i.e., goes back to step 702).

If, on the other hand, the bit flag 308 is set, this indicates that data associated with the short write is stored in cache 216 and has previously been destaged from cache 216 to the RAID layer 306. In such a scenario, the method 700 XORs 708 the new data 300b with the old data 300a to generate a parity delta 400 (i.e., XOR delta). The method 700 then stores 710 the new data 300b and parity delta 400 in cache 216 and links 710 the parity delta 400 to the new data 300b.

In certain embodiments, the method 700 may be modified to enable the parity delta 400 to be updated prior to being destaged to a backend storage drive 204. For example, if the new data 300b discussed above is updated again in cache 216 prior to it being destaged to a backend storage drive 204, the parity delta 400 associated with the new data 300b may also be updated. This may be accomplished by XORing the new data 300b in cache 216 with the new incoming data and applying the resulting parity delta to the parity delta 400 already stored in cache 216. This will update the parity delta 400 to reflect the change to the new data 300b in the cache 216. In this way, the parity delta 400 may be maintained over multiple cache writes that have not yet been destaged to backend storage drives 204. In essence, in this embodiment, a write to the cache 216 may need to create a parity delta 400 in the cache 216 if there is none or update the parity delta 400 if it is already present.

Figure 8:
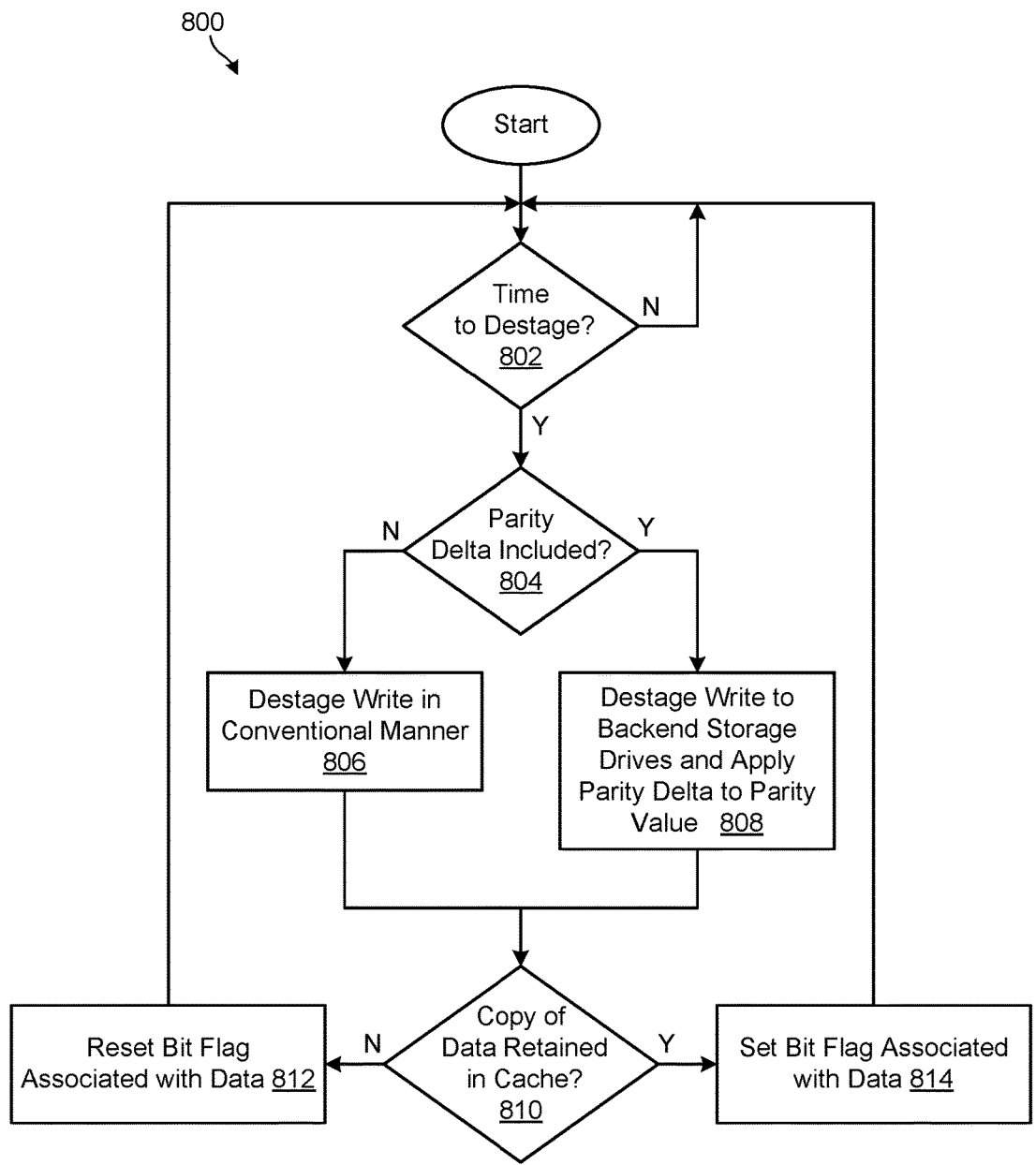
FIG. 8 is a process flow diagram showing one embodiment of a method for destaging data and an associated parity delta from cache.

Referring to FIG. 8, a process flow diagram, showing one embodiment of a method 800 for destaging data from cache 216 to a RAID 310, is illustrated. As shown, the method 800 initially determines 802 whether it is time to destage data from the cache 216 to the RAID layer 306 so that it can be written to the RAID 310. If it is time to destage data from the cache 216 to the RAID layer 306, the method 800 determines 804 whether a parity delta 400 is included with the data to be destaged. If not, the method 800 destages 806 the data in the conventional manner and the method 800 ends.

If a parity delta 400 is included with the data to be destaged, the method 800 destages 808 the write (i.e., the new data 300b) to backend storage drives 204 making up the RAID 310 and applies 808 the parity delta 400 to the parity value 602 in the stride 600 containing the new data 300b. The method 800 then determines 810 whether a copy of the data that was destaged is retained in cache 216. If so, the bit flag 308 associated with the data is set 814 (if not already) and the method 800 ends. If not, the bit flag 308 associated with the data is reset 812 (if not already), the parity delta 400 may be dismissed from the cache 216, and the method 800 ends.

The flowcharts and/or block diagrams in the Figures illustrate the architecture, functionality, and operation of possible implementations of systems, methods, and computer-usable media according to various embodiments of the present invention. In this regard, each block (or layer) in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, in the event the order of steps is not important or the order may be varied without altering the functionality of the invention. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for reducing "I/O amplification" in a redundant array of independent disks (RAID), the method comprising:
   receiving a write request to overwrite old data in cache with new data, wherein the write request is associated with a less-than-full-stride write;
   performing an XOR operation on the new data and the old data to yield a parity delta;
   overwriting, in the cache, the old data with the new data;
   storing the parity delta in the cache and linking the parity delta to the new data; and
   upon destaging the new data from the cache, providing the parity delta with the new data.

2. The method of claim 1, wherein destaging the new data from the cache comprises destaging the new data from the cache to a RAID layer.

3. The method of claim 2, further comprising applying, by the RAID layer, the parity delta to a corresponding parity value in a RAID.

4. The method of claim 1, wherein performing the XOR operation comprises performing the XOR operation prior to overwriting the old data with the new data.

5. The method of claim 1, wherein providing the parity delta comprises providing an address associated with the parity delta.

6. The method of claim 1, wherein performing an XOR operation on the new data and the old data comprises performing the XOR operation only if a bit flag associated with the old data is set.

7. A computer program product for reducing "I/O amplification" in a redundant array of independent disks (RAID), the computer program product comprising a computer-readable medium having computer-usable program code embodied therein, the computer-usable program code configured to perform the following when executed by at least one processor:
   receive a write request to overwrite old data in cache with new data, wherein the write request is associated with a less-than-full-stride write;
   perform an XOR operation on the new data and the old data to yield a parity delta;
   overwrite, in the cache, the old data with the new data;
   store the parity delta in the cache and link the parity delta to the new data; and
   upon destaging the new data from the cache, provide the parity delta with the new data.

8. The computer program product of claim 7, wherein destaging the new data from the cache comprises destaging the new data from the cache to a RAID layer.

9. The computer program product of claim 8, wherein the RAID layer is configured to apply the parity delta to a corresponding parity value in a RAID.

10. The computer program product of claim 7, wherein performing the XOR operation comprises performing the XOR operation prior to overwriting the old data with the new data.

11. The computer program product of claim 7, wherein providing the parity delta comprises providing an address associated with the parity delta.

12. The computer program product of claim 7, wherein performing an XOR operation on the new data and the old data comprises performing the XOR operation only if a bit flag associated with the old data is set.

13. A system for reducing "I/O amplification" in a redundant array of independent disks (RAID), the system comprising:
   at least one processor;
   at least one memory device coupled to the at least one processor and storing instructions for execution on the at least one processor, the instructions causing the at least one processor to:
   receive a write request to overwrite old data in cache with new data, wherein the write request is associated with a less-than-full-stride write;
   perform an XOR operation on the new data and the old data to yield a parity delta;
   overwrite, in the cache, the old data with the new data;
   store the parity delta in the cache and link the parity delta to the new data; and
   upon destaging the new data from the cache, provide the parity delta with the new data.

14. The system of claim 13, wherein destaging the new data from the cache comprises destaging the new data from the cache to a RAID layer.

15. The system of claim 14, wherein the RAID layer is configured to apply the parity delta to a corresponding parity value in a RAID.

16. The system of claim 13, wherein performing the XOR operation comprises performing the XOR operation prior to overwriting the old data with the new data.

17. The system of claim 13, wherein providing the parity delta comprises providing an address associated with the parity delta.

18. The system of claim 13, wherein performing an XOR operation on the new data and the old data comprises performing the XOR operation only if a bit flag associated with the old data is set.

* * * * *